(12) United States Patent
Dysert et al.

(10) Patent No.: US 6,804,690 B1
(45) Date of Patent: Oct. 12, 2004

(54) METHOD FOR PHYSICAL BACKUP IN DATA LOGICAL ORDER

(75) Inventors: David C. Dysert, Holliston, MA (US); Robert A. Boudrie, Ashland, MA (US); Thomas L. Dings, Hopkinton, MA (US); Sujit Suresh Naik, Northborough, MA (US); Neil F. Schutzman, Marlboro, MA (US)

(73) Assignee: EMC Corporation, Hopkinton, MA (US)

( * ) Notice: Subject to any disclaimer, the term of this patent is extended or adjusted under 35 U.S.C. 154(b) by 11 days.

(21) Appl. No.: 09/749,333

(22) Filed: Dec. 27, 2000

(51) Int. Cl.[7] .......................... G06F 12/00; G06F 17/30
(52) U.S. Cl. ..................................................... 707/204
(58) Field of Search ......................................... 707/204

(56) References Cited

U.S. PATENT DOCUMENTS

| | | | | |
|---|---|---|---|---|
| 5,715,452 A | * | 2/1998 | Mori et al. | 395/617 |
| 5,764,972 A | * | 6/1998 | Crouse et al. | 395/601 |
| 5,907,672 A | * | 5/1999 | Matze et al. | 395/182.06 |
| 6,317,755 B1 | * | 11/2001 | Rakers et al. | 707/204 |
| 6,374,266 B1 | * | 4/2002 | Shnelvar | 707/204 |
| 6,408,310 B1 | * | 6/2002 | Hart | 707/201 |
| 6,430,577 B1 | * | 8/2002 | Hart | 707/201 |

* cited by examiner

*Primary Examiner*—Wayne Amsbury
*Assistant Examiner*—Cindy Nguyen
(74) *Attorney, Agent, or Firm*—Robert Kevin Perkins; Leanne J. Fitzgerald; John M. Gunther

(57) ABSTRACT

A system for providing high speed external backup and restoration of data in a data storage system. Individual data objects are backed up in logical order on backup media such as magnetic tape so that they may be retrieved individually. Minimized descriptions of backed up data are transmitted between the host and backup systems to control high speed transfer of data between data servers and backup devices on a separate data channel. The descriptions are manipulated by the backup system to comply with formats of any number of host systems and data storage systems and to efficiently map the backed up data onto the backup devices. The system also provides for restoration of data to the data storage system by using a host system to pre-allocate space for the restored data, obtaining mapping information for the allocated space from the host system, and then directly writing the restored data into the allocated space, based on the mapping information.

1 Claim, 5 Drawing Sheets

METHOD FOR PHYSICAL BACKUP IN DATA LOGICAL ORDER

FIELD OF THE INVENTION

This invention is directed towards data storage systems, and more particularly towards backup and restoration of data residing in data storage systems.

BACKGROUND

Computer systems process increasingly vast quantities of data for a variety of purposes. As the ability of computer systems to process data increases, so does their need for data storage systems which provide very large data storage capabilities and high speed access to the data by computer host systems. Businesses which operate globally typically require round-the-clock access to databases which may be stored in one or more data storage systems. The data that is stored in these data storage systems is changing at an incredible rate. For example, data is changed and updated many times per second in transaction processing applications, reservation systems and data mining applications.

Data must be periodically backed up (copied to another storage medium) for archival purposes and in case of system failure. Data backups are performed frequently because data losses can be catastrophic to businesses or institutions. However, the need for system backups often conflicts with the need for continuous access to data because many computer systems must deny applications access to data while a backup is performed.

A system of providing redundant data storage known as "mirroring" allows fault tolerant data storage, as well as the ability for applications to access data while data backups and restores are being performed. Two or more separate storage devices (which includes physical or virtual disks) store identical data. These mirrors may be located close together in a system, or may be in different geographical locations. This provides a high level of fail safe fault tolerance, and also allows data access during a backup or restore operation. Typically, a backup is performed by stopping the mirroring process (referred to as splitting the mirrors), taking one of the storage devices (mirrors) off line and backing up the data from that mirrors. The other mirror remains online and available. When the first mirror is completely backed up, the two mirrors are resynchronized (so that the data is again identical on both), and the data storage system returns to full operation.

Still further problems arise from the need to backup data in data storage systems. For example, backup operations which require substantial participation by applications and operating systems on host computer systems consume resources of those systems and reduce their performance. Components of data files or other data objects are typically scattered or stored in non-contiguous segments which may span multiple disks within a data storage system. Host operating systems and applications maintain maps such as file allocation tables to identify where each part of each data object is stored. The host operating system knows how to access the files in a logically contiguous format. Therefore, a backup operation that is performed at the application level (a logical backup) requires host system involvement which substantially slows the host system because the applications must first read specific data objects from the data storage system and then write the data files to a backup device such as a magnetic tape drive. Large quantities of individual data objects are typically backed up thereby requiring a host to perform extensive data transfer operations. Further, the backup device is often connected to the host system by a low bandwidth data path, such as an ethernet connection. This process places a large load of streaming data on the low bandwidth data path, degrading performance. Therefore application level backup can archive data in a logical order so that data objects such as individual files may be individually accessed from the backup media; but at a cost of lowered efficiency.

A faster method uses a backup system which streams large quantities of data from a data storage system to a backup device via a high speed direct connection between a backup server and the host storage device without routing the data through a host computer system. The host computer system is not involved in this process. The backup system copies physical segments of data which contain the desired data from the data storage system over the high speed direct connection to the backup device (physical backup). This high speed direct connection can use any of various types of interfaces, such as a SCSI or fibre channel connection.

The physical backup is analogous to a snapshot of the physical segments of data as they were stored on the data storage system. The identical segments of data are read back to the data server in their entirety in order to restore data. Mapping information of the locations of individual data objects are not available to the physical backup system so such high speed backup systems can not typically retrieve specific data objects such as individual files or directory structures from the backup device.

SUMMARY

The present invention includes a system and method for high speed external data backup and restore which allows improved access to individual files and data objects. A backup system for example, EMC Data Manager (EDM) by EMC Corporation of Hopkinton Mass, acquires a description of data to be backed up from an operating system or application that is running on a host computer. The data description includes mapping information which define where data objects are stored in a data storage system and may be communicated to the backup system through a network connection such as a standard ethernet connection. The backup system then causes data to be transferred in logical order from a data server to backup media such as magnetic tape. The transfer of data occurs over high speed data channels such as Symmetric Connect SCSI or fiber by EMC Corporation. The system of the present invention thereby provides the combined advantages of (1) high speed direct data transfer and (2) uniform access to individual data objects on backup media.

The present invention includes a data storage backup system to back up and restore data from a data storage system which is coupled to a host system. It includes an application interface component, running on the host system, to acquire mapping information for data objects stored in said data storage system. It also includes a backup system component coupled to the data storage system, the backup system component receiving the mapping information from the application interface component, to directly access the data objects in the data storage system based on storage locations as indicated by the mapping information. The backup system component reads the data objects in the data storage system and transfers the read data to a backup storage medium. The backup system component can read the data objects in the data storage system in a sequence to access the data objects in a contiguous format.

For operations including restore operations, the application interface component requests the host system to allocate storage locations in the data storage system, and the application interface component acquires mapping information for those allocated storage locations. The backup system component writes data objects into the data storage system based on mapping information for the allocated storage locations.

Components of data files or other data objects are typically scattered or stored in non-contiguous segments which may span multiple disks within a data storage system. Host operating systems, logical volume managers, and applications maintain maps such as file allocation tables to identify where each part of each data object is stored. The backup system described in the present invention is capable of interpreting a provided map of data which describes a host operating system (including logical volumes) or application and using that map to selectively read data objects in logical order from a data storage system. In an illustrative embodiment, this information is obtained and provided by a specialized application. The host system is thereby relieved of the task of reading and assembling data before it is written to backup media.

The present invention also includes an improved method and apparatus for restoring data which is integral to the backup system. Once data has been backed up in logical order according to the method of the present invention, any individual files or data objects may be efficiently retrieved.

A request to restore particular data may be scheduled or generated by a host computer system and communicated through a network connection to the backup system. The backup system may directly locate the required data objects on the backup media because the data objects are stored there in logical order. Also, the backup system does not need to retain a map of the data (as it had been stored in the data storage system prior to being backed up) for restore time. Furthermore, data is frequently moved from one location to another within a data storage system between backup operations. Therefore, data is not restored to a data storage system according to its original map. Rather, a new disk space on the data storage system is allocated to the restored data and a new map of that data is provided by the host system.

Data backup and restoration procedures according to the present invention may be employed by systems having redundant data storage systems, such as RAID-1. Such systems may also use mirror splitting methods to provide a host system with continuous access to data during backup and restore operations.

An advantage of the present invention includes restore granularity that is provided by file level logical backup systems with speed as provided by physical data streaming backup systems.

Another advantage includes the ability to do "smart" or finer grained backups without tying up host computer or network resources. The backup system performs many of the tasks which previously must have been performed by the host systems.

Yet another advantage of the present invention is the ability and flexibility to give a backup and restore system much more control and flexibility over the process of accessing and restoring data in data storage systems, without requiring the backup and restore system to directly work with the complexity of database or operating system file hierarchies. The present invention has the ability to use knowledge of the physical arrangement of data to discern the data logical order despite disk striping or fragmenting.

Further, the present invention allows the backup of files stored on arbitrary storage geometries to be backed up to other geometries. For example, a Logical Volume Manager may be used to allocate a "virtual volume" across several Symmetrix disks. An EDM backup may be restored to a logical volume which uses a different underlying disk geometry, such as a change in stripe size, or number of disks in the striped set. Further, the present invention allows a backup system to pre-allocate empty space on the data storage systems by requesting the host system to handle the details of allocating space on a data storage system (which the host knows how to do), and then the backup system can put data into the allocated space.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
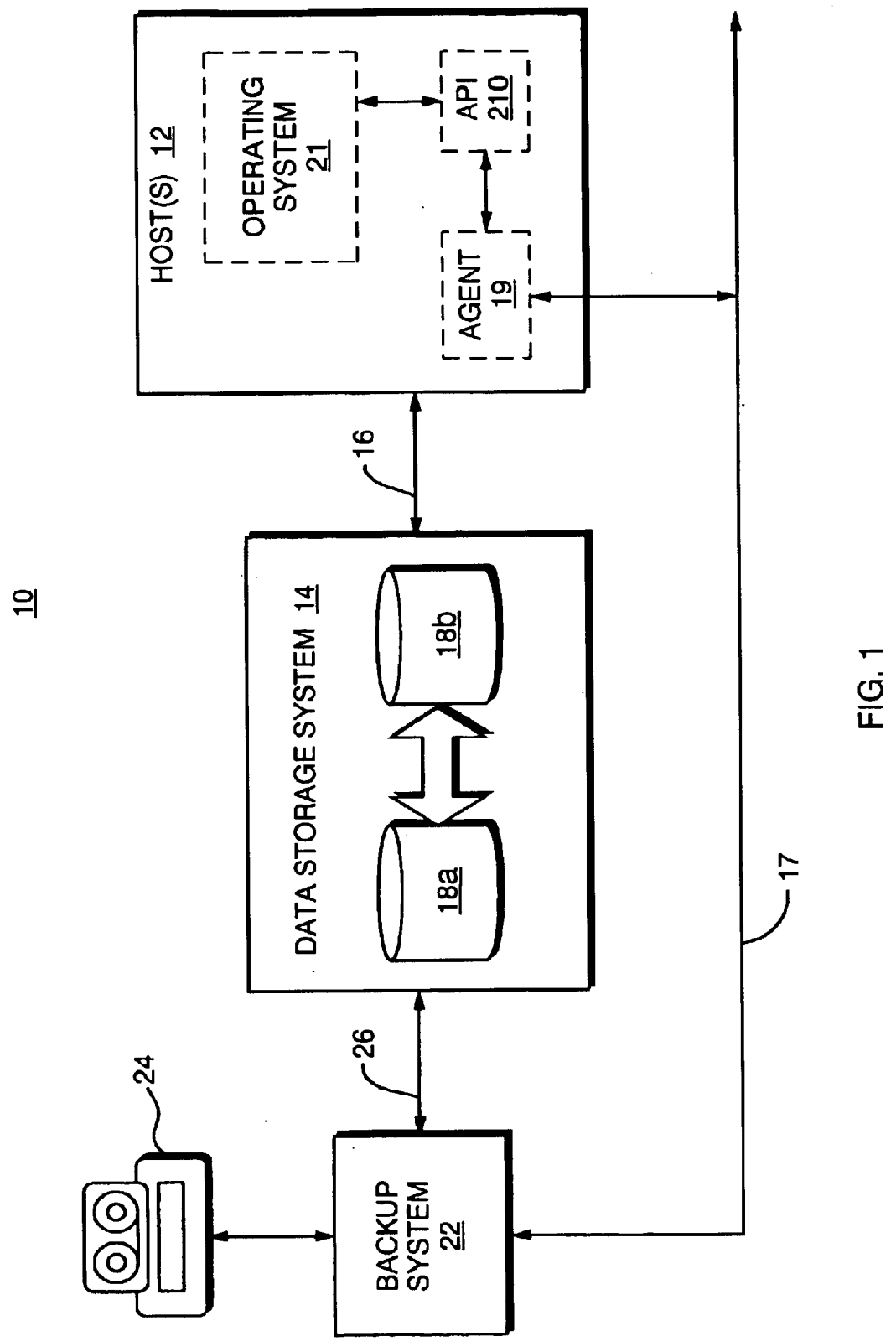
FIG. 1 is a block diagram of a data storage system including backup system components.

An overview of major components of an example data system 10 usable by the present invention is shown in FIG. 1. One or more host computer systems 12 access, process and store data in or on data storage system 14. The host system 12 is interfaced to the data storage system 14 through an interface 16, which may be any of various types of interface such as SCSI or fiber optic. The data storage system 14 may be any of various types of mass data storage systems, including for example a RAID system. A locally mirrored system is illustrated, with two mirrored disk volumes (mirrors) 18a, 18b. The mirrors 18a, 18b are connected 21 such that the data is replicated on both mirrors 18. Although the mirrors 18 are illustrated in a same data storage system 14 enclosure, the mirrors 18 can be physically remote from each other, but still support mirroring using a remote data facility option. The data storage system 14 stores data for any number of applications which run on the host system 12 (not shown). The data storage system 14 provides high level data access and storage services to the host system 12, and allows access to the mirrors 18 at a physical volume level, or as logical volumes, or other levels of abstraction.

A backup system 22 provides control and management of backups of the data stored in the data storage system 14. One backup system may be interfaced to several data storage systems 14 and multiple hosts 12 (not shown). The mapping between data storage systems 14 and hosts 12 is not necessarily one to one. It is possible for one data storage system to serve more than one host. Likewise, it is possible for a host to utilize data stored on more than one storage system. The backup system 22 is interfaced to the host system 12, typically over a standard interface 17 such as an ethernet, token ring, fiber optic system, etc. In an illustrative embodiment, the backup system 22 typically communicates with a client agent 19 running on the host system 12. The client agent 19 communicates with an application program interface (API) 210 which provides utility functionality for the data storage system, including communication with the operating system 21 running on the host system 12. The API will be discussed below.

The backup system 22 provides data backups and restores to appropriate storage devices 24, for example tape storage. In a direct connect system, the backup system 22 is also directly interfaced to the data storage system 14 through a direct connection 26, which typically is a SCSI connection or an alternative connection which typically supports high bandwidth.

The present invention provides for"intelligent" physical backup, in that the data is backed up by the backup system 22, but in a data logical order as specified by the host system 12. Control of the backup operations such as initial setup and handshaking is done over the interface or network channels 17, while the backup data is moved over direct connection channels 26.

Figure 2:
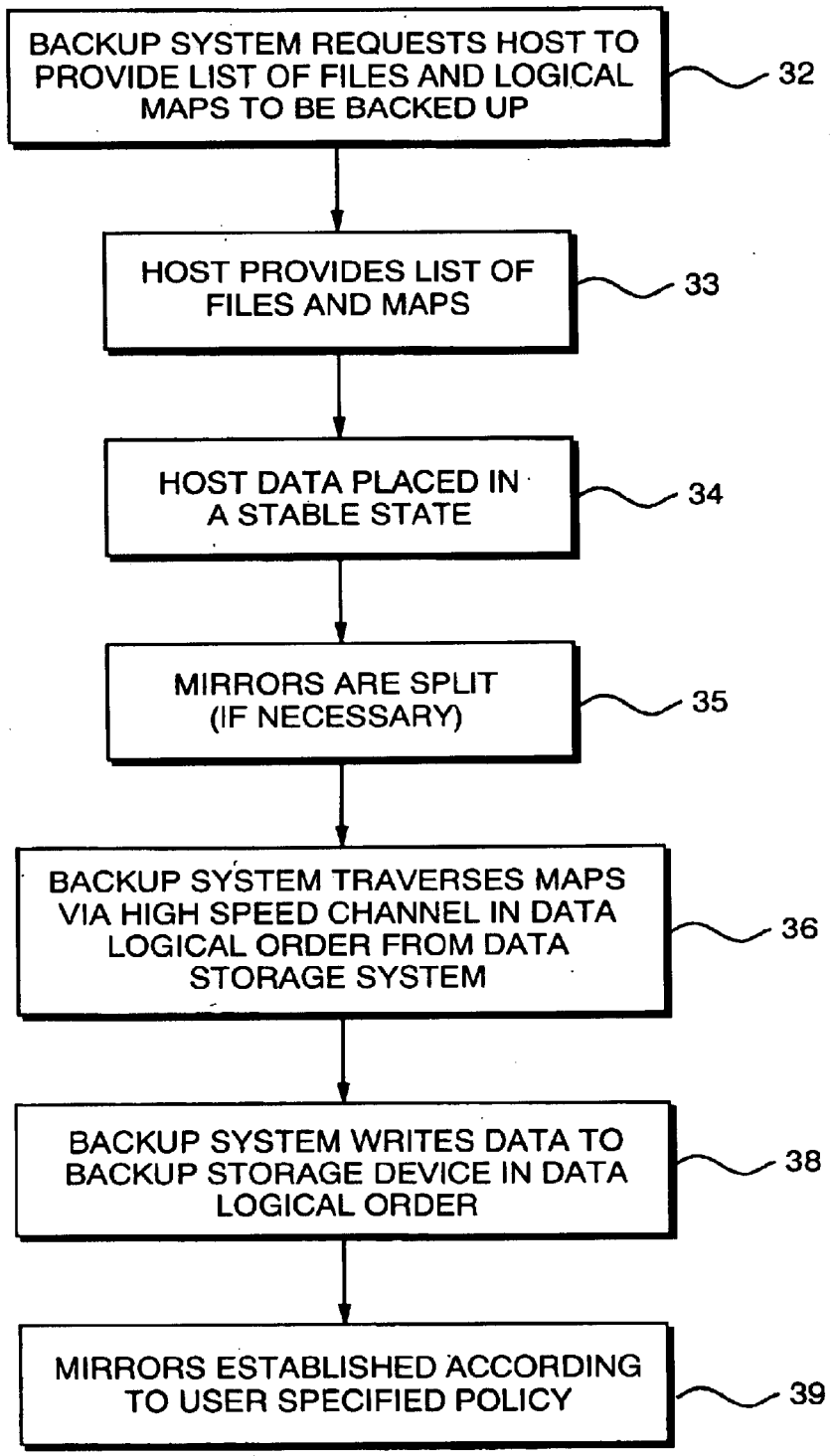
FIG. 2 is a flow chart showing a backup operation according to the present invention.

Referring to FIG. 2, an overview of a backup operation according to present invention is shown. The backup system 22 requests the host system 12 to return a description of the data objects to be backed up, step 32. The host system 12 responds by returning a description of the data objects to be backed up. Data objects are any type of groupings of data stored in the data storage system 14, which typically are data files as described by an operating system running on the host system 12, but also include hierarchical data storage setups, relational, object-oriented or other database storage techniques, contiguous data streams, etc. From these the system creates maps of where the data is stored, step 33. The maps include mapping information of the file allocation and locations as stored on the disks 18 in the data storage system. This mapping information can be based the actual physical volumes of the disks 18, or for logical volumes as provided by the data storage system 14. The maps typically are in the form of disk block addresses and logical extents. These blocks of logical extents will be in the "data logical order" for the underlying object being backed up, such as a file or volume manager logical volume.

The backup system 22 will send a message which instructs the client agent 19 to uiqesce the disk data (place it in a state where a point in time snapshot represents valid backup data) Step 34. At the point, the backup system will split the mirrors within the data storage system (in the case of a mirrored backup), and un-quiesce the data on the host 12, step 35. If the backup system 12 is performing a backup of non-mirrored data, the data will remain quiesced throughout the duration of the backup. In an embodiment implementing backup of Oracle databases, the quiesced state is known as "Oracle Backup Mode."

The backup system 22 traverses the mapping information to access and read the specified data objects from the data storage system 14, step 36. The backup system 22 typically reads the data objects from the data storage system 14 as a sequence of complete data objects. The backup system 22 reads these data objects over a high speed connection 26, and then writes the data to a backup storage device 24 as a sequence of contiguous data objects, step 38. Finally, the mirrors are established, in accordance with the user specified parameters for the system, step 39.

By obtaining mapping information about the storage of the data objects in the data storage system 14, the backup system 22 is able to access and read out the data in any appropriate order or format, such as data logical order, or in order of logical disks. Typically the data would be read out as complete files in an appropriate order. Other methods of reading out the data are also possible, for example reading out data objects in a format helpful for the backup storage device 24, such as certain sizes or formats for efficient storage, or with some variation of striping for speed.

Figure 3:
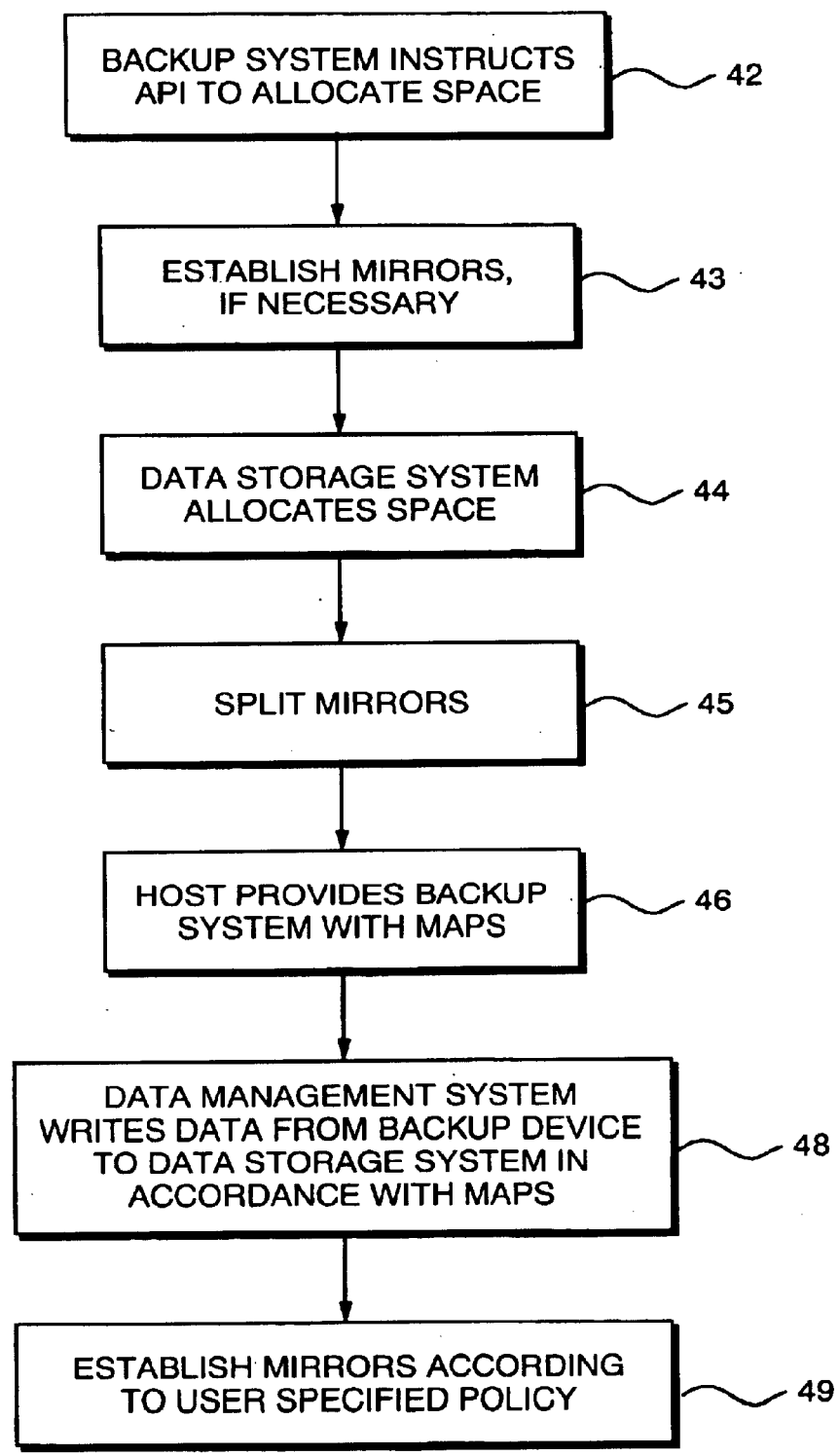
FIG. 3 is a flow chart showing a restore operation according to the present invention.

An overview of a data restore operation according to at least one embodiment of the present invention is shown in FIG. 3. A restore operation may be initiated by the host 12 or by the backup system 22 (not shown). Such restore operations may require specific data objects to be restored, for example when the corresponding objects are somehow corrupted on the data storage system, or performing a "disaster recover" from catastrophic data loss. 14 This procedure may include informing the host of the data objects available on the backup storage device 24, or by logs-stored by the backup system 22 or host 12. The mirrors are established, if necessary, step 43 The backup system 22 instructs the host 12 to allocate storage space on the data storage system 14 for the data objects which are to be restored, step 42 FIG. 4. In the illustrative embodiment, the backup system informs the client agent 19 to inform the API 210 to allocate space. The data storage system 14 allocates the space, step 44. The established mirrors are split, step 45. The host 12 provides the mapping information for the newly allocated space to the backup system 22, step 46. Next, the backup system 22 sequentially reads each requested data object from the backup device 24 and writes the data objects to the data storage system 14 in the allocated space, as indicated by the mapping information, step 48. Finally, the mirrors are established, in accordance with the user specified parameters for the system, step 49.

Figure 4:
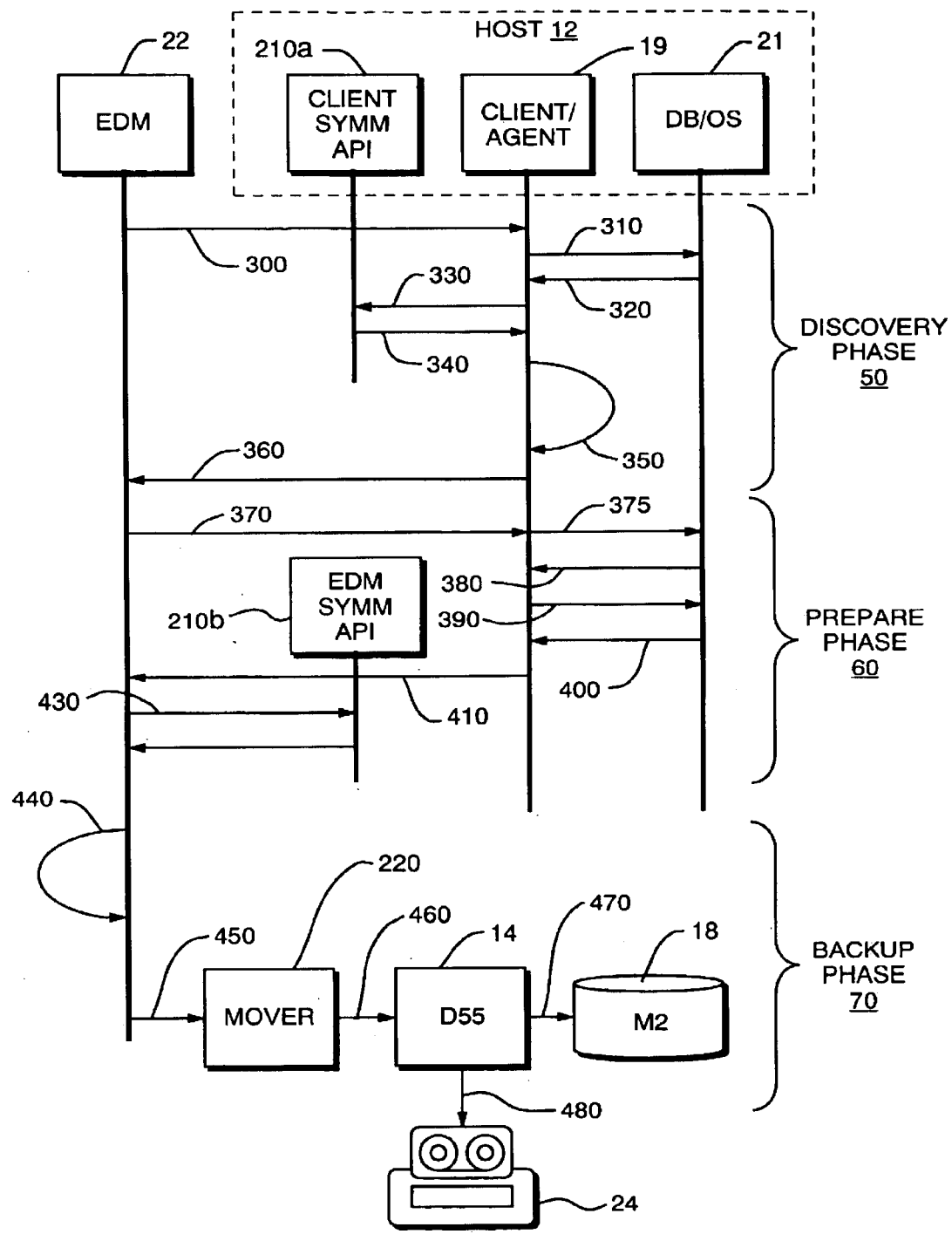
FIG. 4 is a flow chart of a backup procedure according to an illustrative embodiment of the present invention.

The steps performed during backup by an illustrative embodiment of the present invention are detailed in FIG. 4. A backup system 22 for this embodiment includes a data manager which may be the EMC data manager (EDM) available from EMC Corporation of Hopkinton, Mass. A utility called the Symmetrix Application Program Interface (Symm API) 210 that provides utility functions for system administration and management for the Symmetrix data storage system 14 and other systems such as the backup system 22 and host system 12 for this embodiment. The Symm API 210 interfaces with operating systems, applications, file systems, and with any number of data storage systems 14 and backup devices 24. The Symm API 210 also provides an interface between the data manager 200 and the data storage system 14. In the illustrative embodiment, the Symm API 210 runs on two separate parts of the system, the client Symm API 210a runs on the host 12, and the EDM Symm API 210b runs on the backup system 22.

The backup process according to the illustrative embodiment commences with a discovery phase 50 wherein the backup system 22 acquires a description of the data to be backed up. Using a network connection 17 FIG. 1, a backup system 22 transmits a signal 300 FIG. 4 to the client agent 19 running on the host system 12 which requests a description of what data (if any) are to be backed up. The request signal 300 is received by the agent 19 which then queries 310 the host operating system 21 for information about stored data and files. This data may include time or date stamps which indicate when the files were last changed. Alternatively, the agent 19 can query an application such as a database program or logical volume manager, for information regarding the data to back up. The operating system 21 (or application) provides information on the data to back up to the agent 19, step 320. Typically this information will be in the form of a list of file and/or logical devices.

The agent 19 sends this list to the client API 210a, requesting mapping information for data objects corresponding to the list of files to back up, step 330. The mapping information describes the physical or logical storage location of each data object, which may be broken up and scattered throughout any number of physical locations within the data storage system 14. An example of mapping information will be a physical or logical address on a disk, such as disk, block/extent offset, and extent length. The API 210 obtains the mapping information by querying the data storage system 14 (not shown), and sends the mapping information to the agent 19, step 340. The agent 19 processes the mapping information into a different format such as maps of disk locations and extents as shown by arrow 350. This processing may also include compacting the data, for example by converting multiple sequences of similar disk locations into a sequence of offsets and lengths, or a repetition count and offset. For example, striped data on disks often can be represented by an offset extent and a repetition; or a sequence of offsets and lengths. Providing maps in this format can greatly reduce the amount of data needed to passed to the backup system. When complete, the client agent 19 sends the information (file list and mapping information) to the backup system 22, step 360.

After completing the discovery phase 50, the backup system 22 knows what to back up, and now commences the preparation phase 60. To begin the preparation phase 60, the data manager 22 instructs the agent 19 to prepare for a backup operation, step 370. The agent 19 informs the appropriate operating system 21 and/or application to prepare for a backup operation, step 375. Preparation for backup typically includes synchronizing the data by completing any cached writes and suspending write operations (although this is not absolutely necessary). The operating system 21 or application then sends an acknowledgment 380 back to the agent 19. Optionally, the agent 19 may then instruct the operating system 21 to prepare the file system for backup, step 390. The operating system 21 then sends an acknowledgment 400 back to the agent 19. The agent 19 then sends an acknowledgment 410 back to the data manager 22, indicating that the host system is prepared.

The data manager 22 then instructs the data manager EDM Symm API 210b to prepare the data storage system 14 for backup, step 430. The illustrative embodiment shows a mirrored data storage system, so the mirroring of the data on each of the redundant data storage devices 18 is suspended during backup operations, and for this embodiment, the mirrors 18 are split. This means that the data is synchronized to be identical on both data storage devices 18, and then one mirror 18b remains on-line and accessible by the host 12, while the other mirror 18a is taken off-line and then accessed directly by the backup system 22.

As an alternative to splitting the mirrors 18, if there is multi-port access to the disks or mirrors 18, it is possible to do non-mirrored backups. A feature of the present invention is that backups can be done while the disks 18 are being accessed. Since the present invention allows a user to pick exactly what to back up, the user can pick what to back up, for example a certain set of files. The system can do a direct connect backup all or only certain files, and do it while the disk 18 stays on-line. Several applications, such as Oracle brand database products can monitor and handle data that changes while files are being back up, therefore data integrity can be maintained.

The system is now prepared for backup. The final stage is the backup phase 70. The data manager 22 reformats the data and mapping information previously received into a format to be used by the data mover 220, as shown by arrow 440. The data mover 220 is part of the data manager 22, and provides high speed data throughput features, similar to DMA (direct memory access) circuits. The data mover 220 is provided with information about the tracks to be backed up, and then the data mover 220 automatically performs this function. The data mover 220 is provided with high level information regarding tracks to be accessed for backup, and the data mover 220 then performs the stepping repetitions necessary to complete that backup. For the present invention, the data mover 220 is given the mapping information, step 450, to allow the data mover 220 to sequentially access the data objects so as to backup data in the selected format, such as by file hierarchy. Once the data mover 220 has the appropriate mapping information, the data mover 220 then instructs 460 the data storage system 14 to access specific tracks on the data storage device 18a, and stream the data objects to the backup device 24, as shown by arrows 470 and 480. Once the data objects have been backed up, the system is returned to normal operation.

Figure 5:
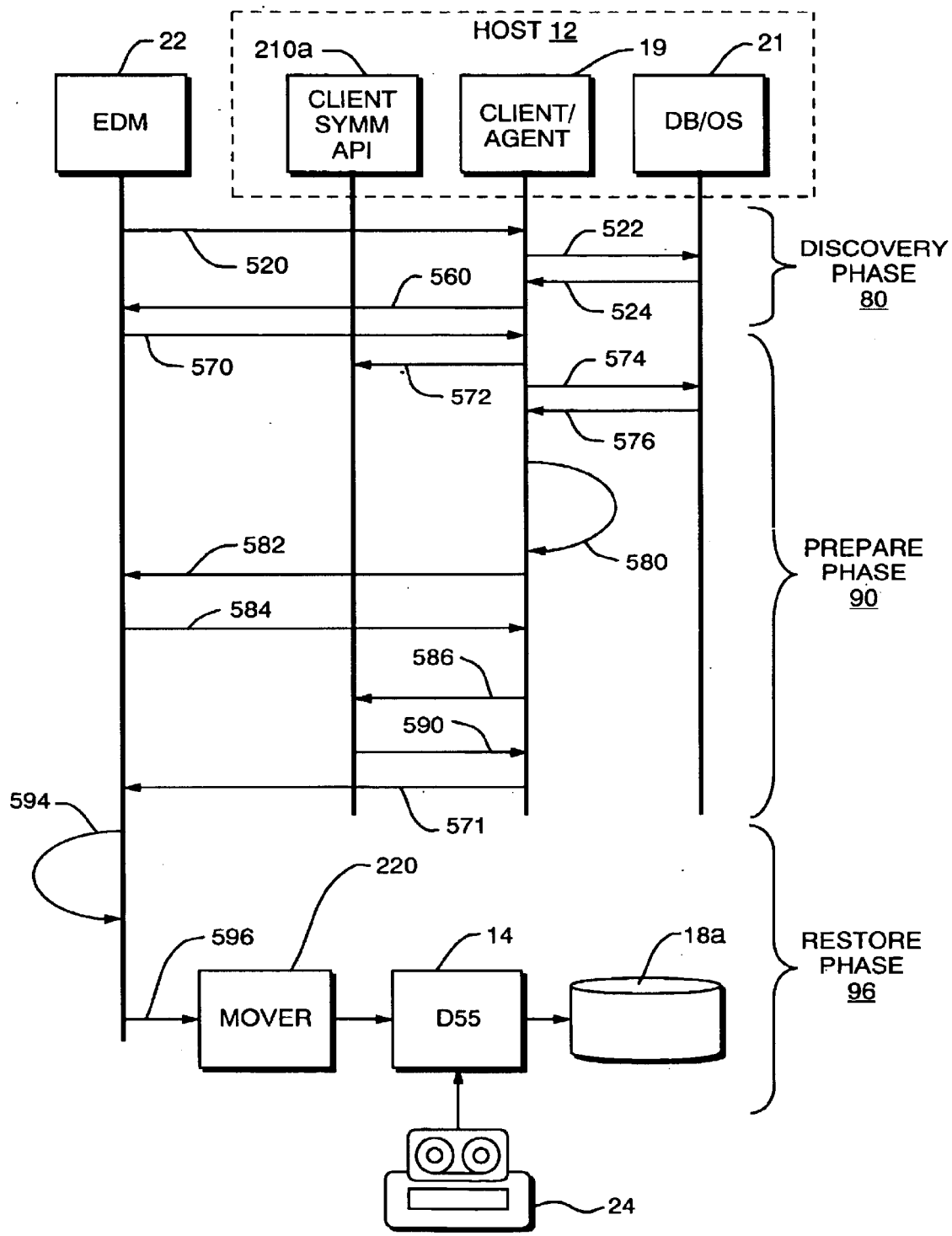
FIG. 5 is a flow chart of a data restoration procedure according to an illustrative embodiment of the present invention.

A restore operation according to the illustrative embodiment is detailed in FIG. 5. The process begins with a discover stage 80. The logs are checked to determine what has been backed up and is available for restoring (not shown). These logs in the illustrative embodiment are EDM catalogs which provide information about prior backups and system state. The backup system 22 may also transmit a signal 520 FIG. 5 to the client agent 19 running on the host system 12 which requests a description of the data presently in the data storage system 14. The agent 19 queries 522 the host operating system 21 and/or applications for information about stored data and files. The operating system 19 (or application 17) provides file information to the data manager 22, step 560. The backup system now knows what is presently in the data storage system 14, and what is on the backup storage 24, and can make appropriate decisions about what to restore.

The prepare phase 90 is next. The data manager 22 informs the agent 19 to obtain a specified amount space on the data storage system 14 in order to restore the data. step 570. The specified amount of space is the total size of the data which will be restored to the data storage system 14. A feature of the present invention is that the host system 12 will perform the housekeeping routines for allocating space on the data storage system 14, but the backup system 22 actually puts the restored data in the newly allocated space. The backup system 22 does not need to understand the nuances of the file system as maintained by the operating system 21, the backup system 14 only has to put data in locations as indicated by mapping information provided to it. The agent 19 requests the operating system 21 to allocate space, step 574. The operating system 21 allocates the space, and returns mapping information to the client agent 19, step 576. As previously described with reference to a backup operation with FIG. 4, the agent 19 may process and compress this data into maps, as shown by arrow 580, and then sends the maps to the backup system 22, step 582. The backup system 22 informs the agent 19, step 584, to inform the API 210 to prepare for backup, step 586; and the API 210 sends an acknowledgement back to the agent 19, step 590. Finally the agent 19 sends an acknowledgment back to the backup system 22, that the system is ready for the restore.

The final phase is the restore phase 96. The data manager 22 reformats the data and mapping information previously received into a format to be used by the data mover 220, as shown by arrow 594. The data mover 220 is given the mapping information, step 596, to allow the data mover 220 to sequentially access the allocated space on the data storage system 14 and put the data objects received from the backup storage 24 in the proper locations on the mirror 18. Once the data objects have been restored, the system is returned to normal use.

The present invention has been described in terms of backing up a massive data storage system with mirroring technology, however the present invention is applicable to many storage systems. Any data storage system with a backup utility can be improved from the present invention. Any type of data storage system can benefit, including magnetic and optical disks, flash memory etc.

Although exemplary embodiments have been described, other embodiments and modifications of the invention are intended to be covered by the spirit and scope of the appended claims.

What is claimed is:

1. A method for restoring or backing up data, either from or to a backup storage medium or from or to a data storage system depending on whether the data is being backed up or restored and wherein said data is used by a host system; said method comprising:

acquiring from said host system through an application interface component mapping information for data objects to back up and allocate space to hold the data objects when restored; said mapping information indicating storage locations including logical extents of data objects in said data storage system or on a backup storage medium;

a backup component or a restore component separate from the host selectively and directly accessing said storage locations as indicated by said mapping information obtained through the application interface component, thereby relieving the host of reading and assembling data before it is written to or restored from a backup medium; and if a restore operation is requested, a restore component receiving the mapping information from the application interface component and interpreting the mapping information, requesting said host system to allocate space on said data storage system to hold a plurality of data objects requested to be restored, and the restore component sequentially reading each requested data object from the backup storage medium in data logical order and writing the data objects to the data storage system in the allocated space, as indicated by the mapping information, thereby restoring the requested data objects from the backup storage medium; and if a backup operation is requested, a backup component receiving the mapping information from the application interface component and interpreting the mapping information, then directly accessing and reading said data objects from said data storage system in data logical order for the data objects being backed up based on storage locations as indicated by said mapping information including logical extents; and transferring said read data to a backup storage medium.

* * * * *